(12) United States Patent
Chang

(10) Patent No.: US 11,774,595 B2
(45) Date of Patent: Oct. 3, 2023

(54) MAP SCANNING SYSTEM AND MAP SCANNING METHOD

(71) Applicant: INSTITUTE FOR INFORMATION INDUSTRY, Taipei (TW)

(72) Inventor: Jun-Dong Chang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 67 days.

(21) Appl. No.: 17/456,160

(22) Filed: Nov. 22, 2021

(65) Prior Publication Data
US 2023/0152456 A1  May 18, 2023

(30) Foreign Application Priority Data

Nov. 17, 2021 (CN) .......................... 202111361138.0

(51) Int. Cl.
*G01S 17/89* (2020.01)
*G06T 7/73* (2017.01)
*G01S 17/86* (2020.01)

(52) U.S. Cl.
CPC .............. *G01S 17/89* (2013.01); *G01S 17/86* (2020.01); *G06T 7/74* (2017.01); *G06T 2207/10028* (2013.01); *G06T 2207/30252* (2013.01)

(58) Field of Classification Search
CPC ............ G01S 17/89; G01S 17/86; G06T 7/74
USPC .......................................................... 348/116
See application file for complete search history.

(56) References Cited

U.S. PATENT DOCUMENTS

2018/0188037 A1   7/2018 Wheeler et al.

FOREIGN PATENT DOCUMENTS

JP       H10260726      *  9/1998

OTHER PUBLICATIONS

JPH10260726 Machine Translation.*

* cited by examiner

*Primary Examiner* — Nguyen T Truong
(74) *Attorney, Agent, or Firm* — CKC & Partners Co., LLC

(57) ABSTRACT

A map scanning method including the following step: scanning, by a scanning device, a location area of a vehicle to obtain location data, wherein the scanning device includes a lidar sensor, and the lidar sensor is configured to scan the location area to obtain a scan point cloud data of the location data; comparing, by a processor, the location data with a basic map to obtain a first point cloud area corresponding to the location data in the basic map; Comparing the scan point cloud data with the first point cloud area to calculate a matching degree value; and when the matching degree value is less than an update threshold, updating the first point cloud area according to the scan point cloud data.

16 Claims, 5 Drawing Sheets

MAP SCANNING SYSTEM AND MAP SCANNING METHOD

CROSS-REFERENCE TO RELATED APPLICATION

This application claims priority to China Application Serial Number 202111361138.0, filed Nov. 17, 2021, which is herein incorporated by reference in its entirety.

BACKGROUND

Technical Field

The present disclosure relates to a map scanning system and a map scanning method, especially a technology that uses point clouds to locate vehicles.

Description of Related Art

With the development of technology, vehicle has become an indispensable tool for people. "Autonomous vehicle" is currently one of the most popular research projects. "Autonomous vehicle" requires a location positioning technology to confirm the current location of the vehicle for navigation and real-time control. At present, although there are many types of sensors that can be arranged in vehicles for location positioning, the accuracy of the sensors will be affected by special environments (such as tunnel terrain or heavy rain), or even completely unusable.

SUMMARY

One aspect of the present disclosure is a map scanning method, comprising the following steps: scanning, by a scanning device, a location area of a vehicle to obtain a location data, wherein the scanning device comprises a lidar sensor, and the lidar sensor is configured to scan the location area to obtain a scan point cloud data of the location data; comparing, by a processor, the location data with a basic map to obtain a first point cloud area corresponding to the location data in the basic map; comparing the scan point cloud data with the first point cloud area to calculate a matching degree value; and when the matching degree value is less than an update threshold value, updating the first point cloud area according to the scan point cloud data.

Another aspect of the present disclosure is a map scanning system, comprising a scanning device, a storage unit and a processor. The scanning device is configured to scan a location area of a vehicle to obtain a location data. The scanning device comprises a lidar sensor, and the lidar sensor is configured to scan the location area to obtain a scan point cloud data of the location data. The storage unit is configured to store a basic map. The basic map comprises a plurality of point cloud areas. The processor is connected to the scanning device and the storage unit, and is configured to obtain the location data. The processor is configured to compare the location data with the plurality of point cloud areas to obtain a first point cloud area corresponding to the location data in the basic map. The processor is configured to compare the scan point cloud data with the first point cloud area to calculate a matching degree value. When the matching degree value is less than an update threshold value, the processor is configured to update the first point cloud area according to the scan point cloud data.

Another aspect of the present disclosure is a map scanning method, comprising the following steps: scanning, by a lidar sensor of a scanning device, a location area of a vehicle to obtain a scan point cloud data; scanning, by an image sensor of a scanning device, the location area of a vehicle to obtain a scan image data; comparing, by a processor, the scan image data with a basic map to obtain a first image area in the basic map; comparing, by the processor, the scan point cloud data with a part of the basic map corresponding to the first image area to obtain a first point cloud area in the basic map; and selectively updating the first point cloud area according to the scan point cloud data.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1A:
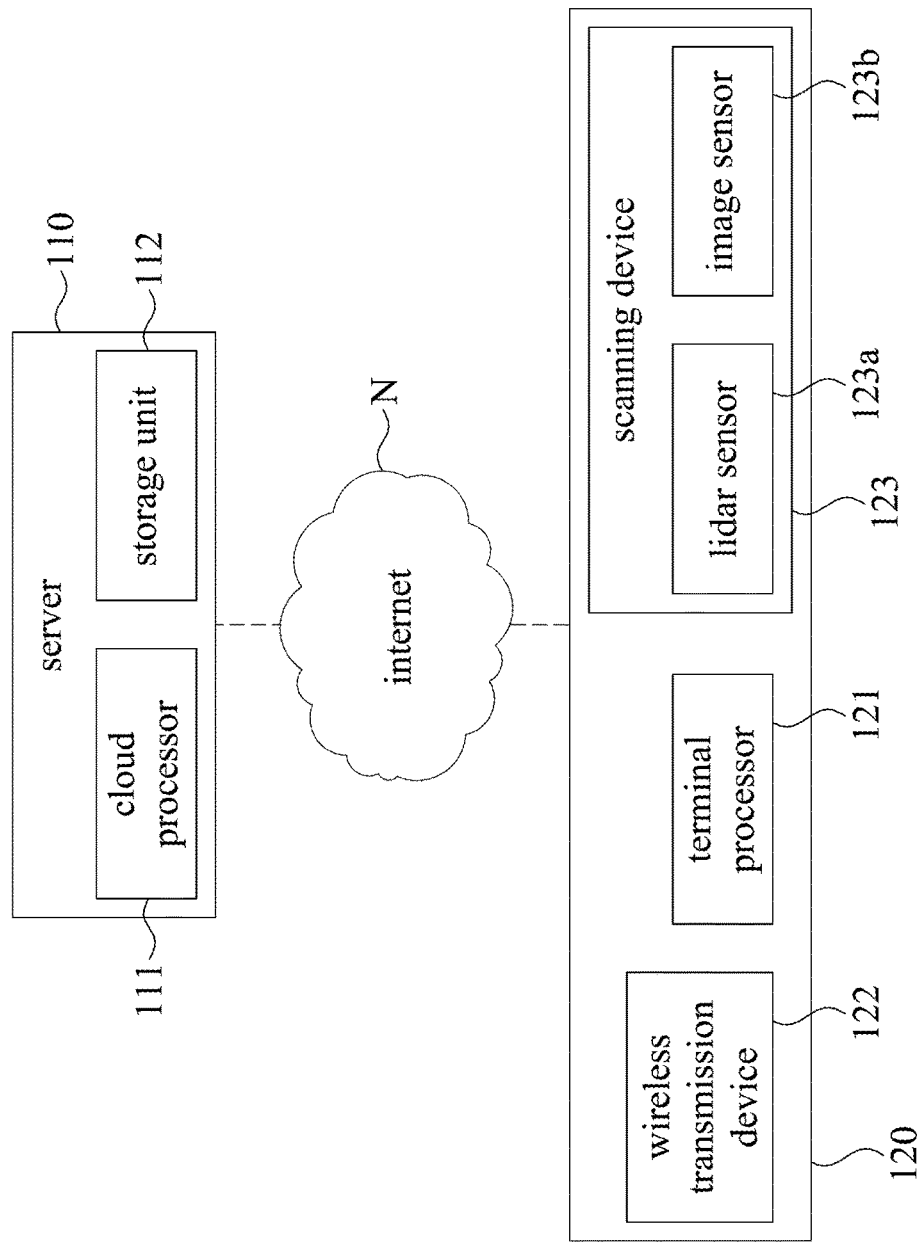
FIG. 1A is a schematic diagram of a map scanning system in some embodiments of the present disclosure.
Figure 1B:
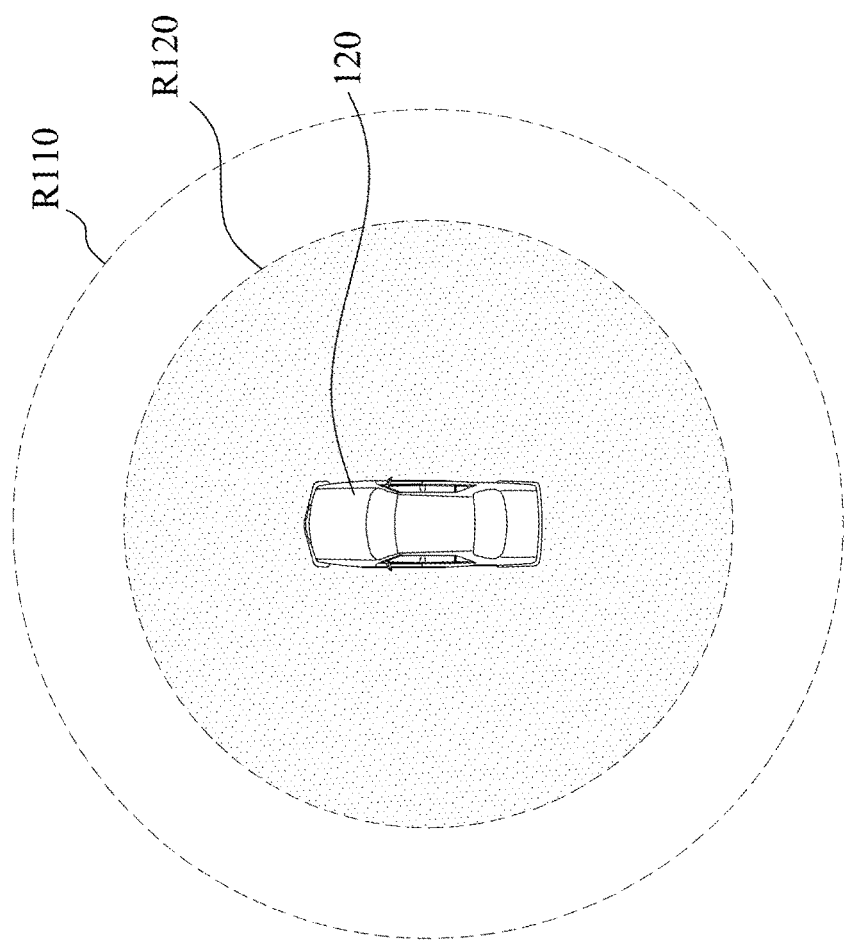
FIG. 1B is a schematic diagram of a map scanning system in some embodiments of the present disclosure.

FIG. 1A and FIG. 1B are schematic diagrams of a map scanning system in some embodiments of the present disclosure. In this embodiment, the map scanning system 100 is implemented to a server 110 and a vehicle 120. The server 110 stores a basic map configured to location positioning service. The vehicle 120 connects to the server 110 (e.g., by internet), and is configured to regularly uploads the location data, so that the server 110 determines the current location of the vehicle 120 according to the location data, and provide autonomous driving instructions. However, the application of the present disclosure is not limited to this, in some other embodiments, the server 110 can provide the vehicle 120 navigation instructions, or simply serve as a cloud map for the driver of the vehicle 120 as a reference.

The server 110 includes a cloud processor 111 and a storage unit 112. The cloud processor 111 is configured to transmit command to the vehicle, or provide responds according to the request (e.g., request to provide map or coordinates) uploaded by the vehicle 120. The storage unit 112 is configured to store the basic map, the definition and details of the basic map will be detailed in the following paragraphs.

The vehicle 120 includes a terminal processor 121, a wireless transmission device 122 and a scanning device 123. The terminal processor 121 is electrically connected to the wireless transmission device 122 and the scanning device 123, and is configured to connect to the server 110 by the wireless transmission device 122.

As shown in FIG. 1A and FIG. 1B, the scanning device 123 is configured to scan a location area R100 where the vehicle 120 is located, and store the scan result as a location data. In one embodiment, the scanning device 123 includes a lidar sensor 123*a* (i.e., light detection and ranging, LiDAR). The principle of the lidar sensor 123*a* is to transmit a pulsed laser signal, and calculate the distance between the vehicle and the object (e.g., surrounding terrain or buildings) according to the time interval between transmitting the signal and receiving the response signal. After the lidar sensor 123*a* scans the location area R100, the scan point cloud data will be obtained. "Point cloud" is a type of three-dimensional spatial data. Since one skilled in art can understand the operation of the lidar sensor 123*a*, it will not be explained here.

In some embodiments, the scanning device 123 further includes a image sensor 123*b*(e.g., camera). The image sensor 123*b* scans the location area R100 to obtained a scan image data. As shown in FIG. 1B, the areas R110 and the areas R120 are the scanning range of the lidar sensor 123*a* and the image sensor 123*b* respectively. In particular, FIG. 1B is only a schematic diagram. The scanning range of the lidar sensor 123*a* and the image sensor 123*b* is not limited to a 360-degree circle, and the scanning range of the lidar sensor 123*a* is not necessarily smaller than scanning range of the image sensor 123*b*. The schematic diagram in FIG. 1B is used to express that the scanning device 123 is configured to scan the surrounding area of the vehicle 120.

Figure 2:
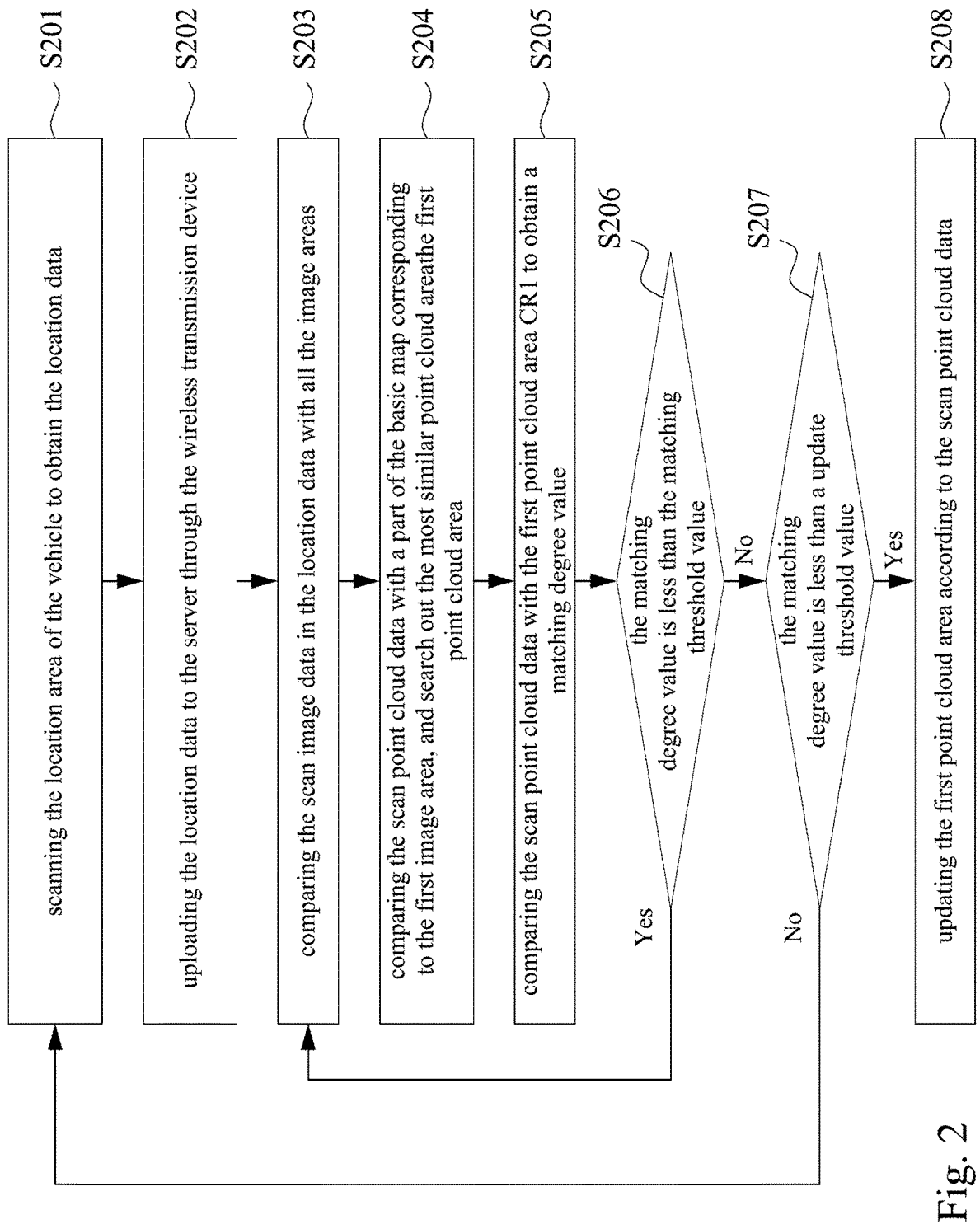
FIG. 2 is a flowchart illustrating a map scanning method in some embodiments of the present disclosure.

The map scanning system 100 of the present disclosure accurately locates the location of the vehicle 120, and is further configured to updates the basic map. FIG. 2 is a flowchart illustrating a map scanning method in some embodiments of the present disclosure. The map scanning system 100 confirems the current location of the vehicle 120 according to step S201-S208, and selectively updates the basic map.

In step S201, when the vehicle 120 is driving, the scanning device 123 scans the location area of the vehicle 120 to obtain the location data. As mentioned above, "the location data" can be the scan point cloud data detected by the lidar sensor 123*a*, and it can also include the scan image data detected by the image sensor 123*b*.

In step S202, after obtaining the location data, the terminal processor 121 uploads the location data to the server 110 through the wireless transmission device 122 (e.g., via Internet N). The cloud processor 111 of the server 110 compares the location data with the basic map to obtain the first point cloud area CR1 corresponding to the location data in the basic map. The comparison method of the cloud processor 111 and the definition of the basic map are described below.

Figure 3:
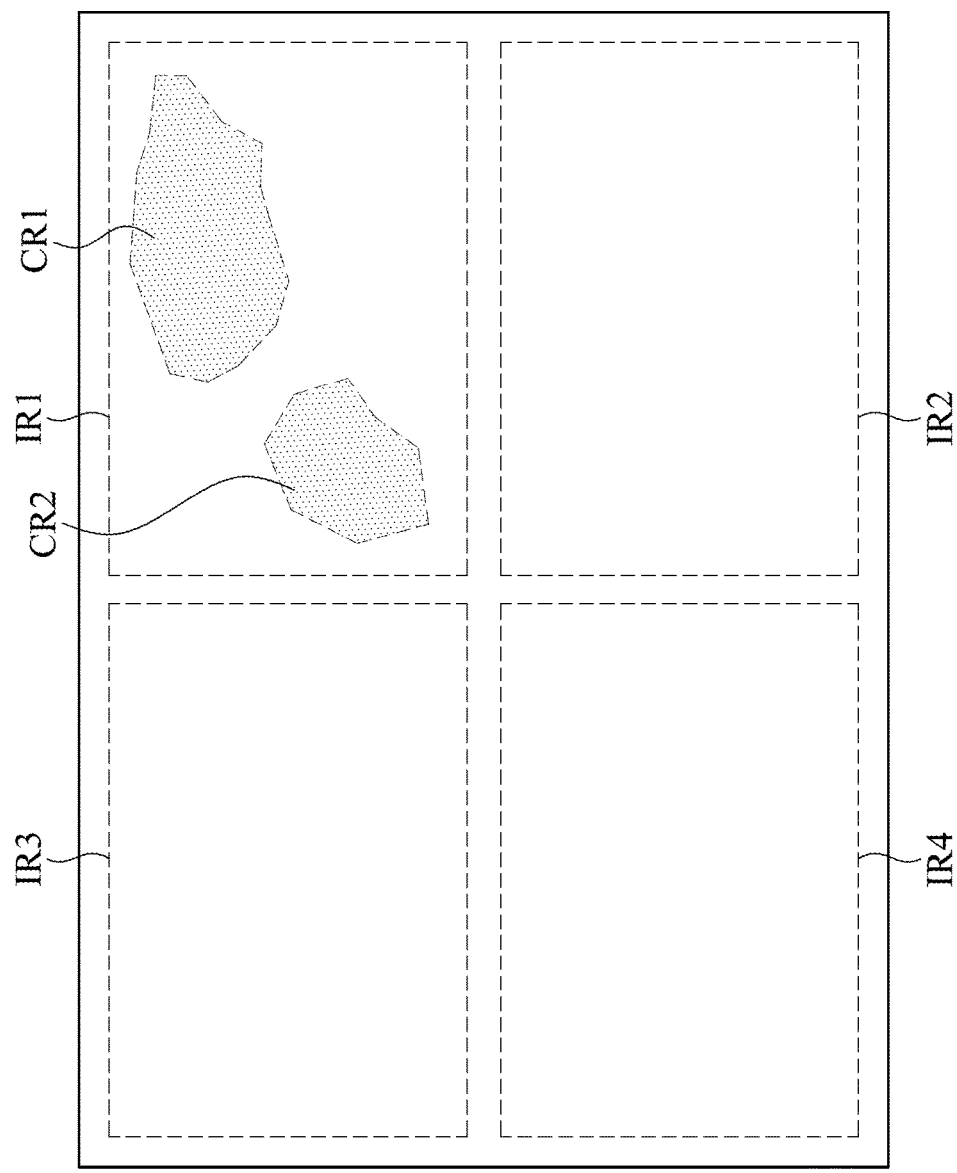
FIG. 3 is a schematic diagram of the basic map in some embodiments of the present disclosure.

FIG. 3 is a schematic diagram of the basic map in some embodiments of the present disclosure. In some embodiments, the basic map 200 includes multiple image areas IR1-IR4 and multiple point cloud areas CR1, CR2. The image areas IR1-IR4 and the point cloud areas CR1, CR2 are overlap to each other to form the basic map 200. The size of each image area IR1-IR4 and the size of each point cloud area CR1, CR2 need not be the same. For example, the image areas IR1 and the point cloud areas CR1 overlap. In one embodiment, the image areas are larger than the point cloud areas, so one image area can overlap with multiple point cloud areas.

Specifically, the image sensor 123*b* uses ORB (Oriented FAST and Rotated BRIEF) feature extraction detection technology to perform SLAM (Simultaneous Localization and Mapping, SLAM) mapping to generate the scan image data. The lidar sensor 123*a* uses the NDT algorithm (Normal Distribution Transform) for SLAM mapping to generate the scan point cloud data. The scan image data and the scan point cloud data are overlapped to form the basic map. The overlap method can use the ICP (Iterative Closest Point) algorithm, but it is not limited to this. In step S203, when the server 110 receives the location data, the cloud processor 111 compares the scan image data in the location data with all the image areas IR1-IR4, so as to searches out one of the image areas IR1-IR4 that corresponds to the scan image data, which is the most similar to the image areas, such as a first image area IR1.

in step S204, after obtaining the first image area IR1 corresponding to the scan image data, the cloud processor 111 further compares the scan point cloud data with the basic map according to the first image area IR1. In other words, the cloud processor 111 compares the scan point cloud data with a part of the basic map corresponding to the first image area IR1 (i.e., all the point cloud areas in the first image area IR1), and search out the most similar point cloud area, such as the first point cloud area CR1.

The above steps S203-S204 compare the "image" first, and then compare the "point cloud". By sequentially comparing different types of the location data, the areas corresponding to the scan point cloud data in the basic map 200 can be quickly found. However, the present disclosure is not limited to this, in some other embodiments, the location data can only include the scan point cloud data, and the cloud processor 111 can directly compare the scan point cloud data with all the point cloud areas CR1, CR2 to find the most similar point cloud area (the first point cloud area CR1).

For example, the vehicle 120 drives through a train station, so the location data uploaded by the scanning device 123 is the point cloud data of the "road in front of the train station". The basic map 200 records the entire city map where the train station is located, which also includes point clouds such as "roads in front of the railway station", "roads behind the railway station", and "city center". Accordingly, by comparing the location data with the basic map 200, the cloud processor 111 can determine that the vehicle 120 is currently located on the "road in front of the train station". In some embodiments, by sequentially comparing the "image" and "point cloud" of the location positioning, the map scanning system can determine the current location of the vehicle 120 without using a GPS device (Global Positioning System).

In step S205, after searching out the first point cloud area, the cloud processor 111 compares the scan point cloud data with the first point cloud area CR1 to obtain a matching degree value. "The matching degree value" is configured to represent the similarity between the current scan result of the vehicle 120 (the scan point cloud data) and the data stored in the server 110 (the first point cloud area). For example, if the matching degree value between the scan point cloud data and the first point cloud area CR1 is 96%, it means that the two are almost the same. Similarly, if the matching degree value between the scan point cloud data and the first point cloud area CR1 is 85%, it means that there is a significant difference between the two. At this time, the server 110 can selectively update the first point cloud area CR1.

in step S206, the cloud processor 111 determines whether the matching degree value is less than the matching threshold value (e.g., 75%), if the matching degree value is less than the matching threshold value, it means that the difference between the scan point cloud data and the first point cloud area CR1 is too large, and the location result is incorrect. At this time, back to step S203 to compare the location data with the basic map 200 again.

If the matching degree value is larger than the matching threshold value, in step S207, the cloud processor 111 determines whether the matching degree value is less than a update threshold value (e.g., 85%, the update threshold value is different from the matching threshold value). In step S208, if the matching degree value is less than the update threshold value, it means that the location area R100 of the vehicle 120 may have changed (e.g., building changing, road trimming, etc.). At this time, the cloud processor 111 will update the first point cloud area CR1 according to the scan point cloud data. If the matching degree value is larger than the update threshold value, it means that the first point cloud area CR1 does not need to be updated, so back to step S201 to continue to scan and obtain the location result.

In some embodiments, when the cloud processor 111 prepares to update the first point cloud area CR1 according to the scan point cloud data, the cloud processor 111 first records the first point cloud area CR1 as the unupdated area. Then, when the vehicle 120 completes the current trip and is in the idle state, the cloud processor 111 updates the first point cloud area CR1 according to the scan point cloud data. The above "the idle state" means that the vehicle 120 stops continuously uploading the location data, or the server 110 stops comparing the location data and the basic map (i.e., the load of the server 110 is relatively small).

Figure 4:
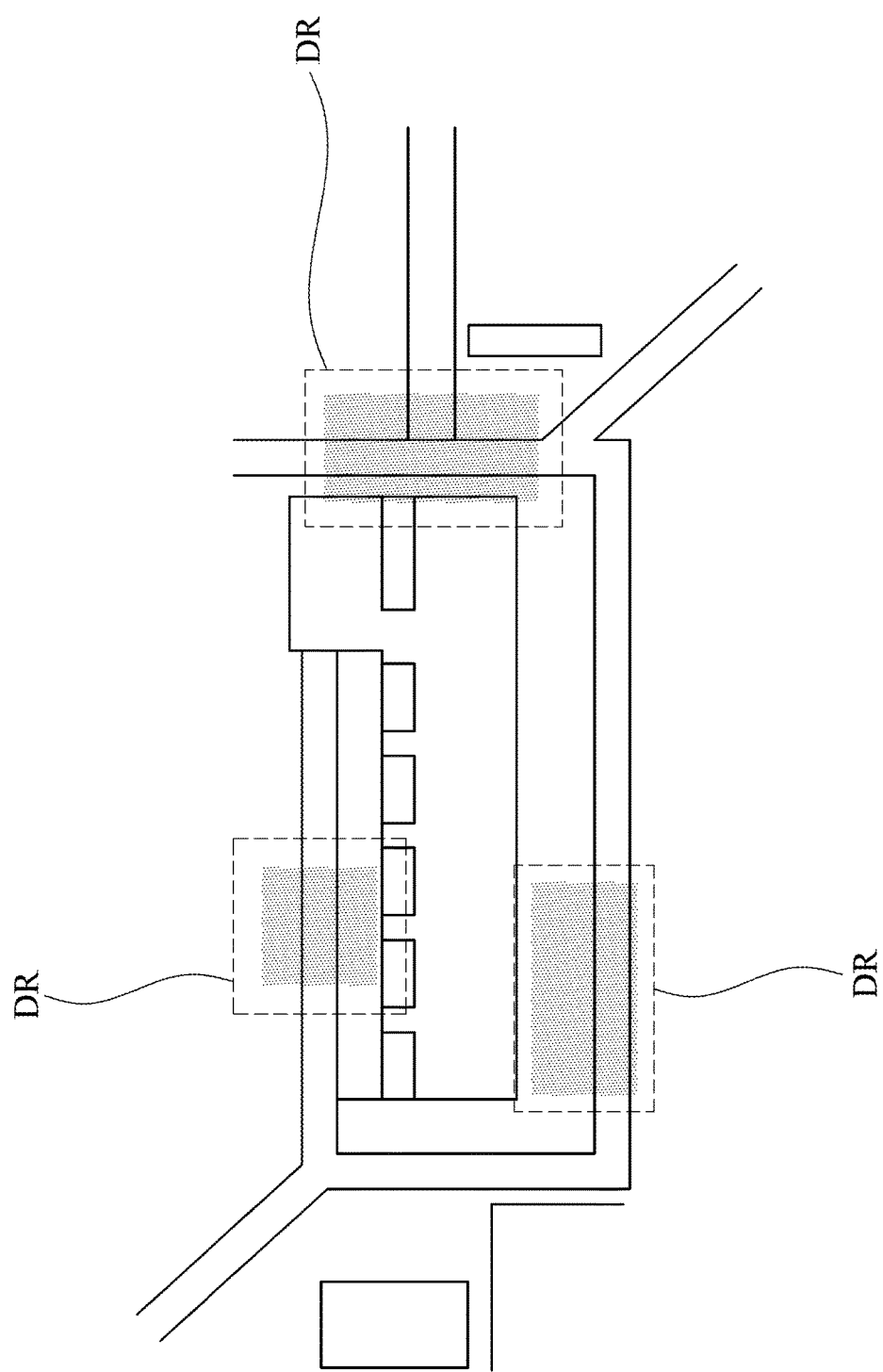
FIG. 4 is a schematic diagram of updating the first point cloud area in some embodiments of the present disclosure.

FIG. 4 is a schematic diagram of updating the first point cloud area CR1 (or a part of the basic map 200) in some embodiments of the present disclosure. If the matching degree value is less than the update threshold value and the update program will be performed, the cloud processor 111 marks a difference area DR in the first point cloud area CR1 that is different from the scan point cloud data on the basic map 200, and the cloud processor 111 clears the difference area. Then, the cloud processor 111 updates point cloud data of the difference area according to the scan point cloud data.

In addition, in some other embodiments, the cloud processor 111 determines whether the basic map 200 has been updated recently. If the basic map 200 has been updated during the update period (e.g., within 10 days), the cloud processor 111 stops determining whether the matching degree value is less than the update threshold value (step S207) to reduce the computing load. Similarly, if the cloud processor 111 determines that the basic map has not been updated during the update period, the cloud processor 111 updates the first point cloud area according to the scan point cloud data.

In the foregoing map scanning method, various steps are mainly performed by the cloud processor 111, but in some other embodiments, the steps of the cloud processor 111 can also be performed by the terminal processor 121 instead. In other words, the terminal processor 121 can connect to the storage unit 112 of the server 110 to obtain the basic map 200, and compare the location data and the basic map accordingly, or update the basic map. Then, the terminal processor 121 can upload the results of performing various steps to the server 110 to reduce the computing load of the cloud processor 111.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A map scanning method, comprising:
scanning, by a scanning device, a location area of a vehicle to obtain a location data, wherein the scanning device comprises a lidar sensor, and the lidar sensor is configured to scan the location area to obtain a scan point cloud data of the location data;
scanning, by an image sensor of the scanning device, the location area to obtain a scan image data of the location data;
comparing the scan image data with a plurality of image areas in a basic map to search out a first image area of the plurality of image areas corresponding to the scan image data; and
comparing the scan point cloud data with the basic map corresponding to the first image area to search out a first point cloud area;
comparing the scan point cloud data with the first point cloud area to calculate a matching degree value; and
when the matching degree value is less than an update threshold value, updating the first point cloud area according to the scan point cloud data.

2. The map scanning method of claim 1, wherein the first point cloud area and the first image area overlap each other to form a part of the basic map.

3. The map scanning method of claim 1, further comprising:
when the matching degree value is less than a matching threshold value, comparing the location data with the basic map again, wherein the matching threshold value is different from the update threshold value.

4. The map scanning method of claim 1, wherein updating the first point cloud area according to the scan point cloud data comprises:
determining whether the basic map has been updated during an update period; and
when the basic map has not been updated during the update period, updating the first point cloud area according to the scan point cloud data.

5. The map scanning method of claim 1, wherein updating the first point cloud area comprises:
recording the first point cloud area as an unupdated area; and
when the vehicle is in an idle state, updating the first point cloud area according to the scan point cloud data.

6. The map scanning method of claim 5, wherein when the vehicle is in the idle state, stopping comparing the location data of the vehicle with the basic map.

7. A map scanning system, comprising:
a scanning device configured to scan a location area of a vehicle to obtain a location data, wherein the scanning device comprises a lidar sensor and an image sensor, the lidar sensor is configured to scan the location area to obtain a scan point cloud data of the location data, and the image sensor is configured to scan the location area to obtain a scan image data of the location data;

a storage unit, configured to store a basic map, wherein the basic map comprises a plurality of point cloud areas and a plurality of image areas; and a processor connected to the scanning device and the storage unit, configured to obtain the location data, and configured to compare the scan image data with the plurality of image areas to search out a first image area of the plurality of image areas corresponding to the scan image data;

wherein the processor is further configured to compare the scan point cloud data with the basic map corresponding to the first image area to search out a first point cloud area; and wherein the processor is configured to compare the scan point cloud data with the first point cloud area to calculate a matching degree value, and when the matching degree value is less than an update threshold value, the processor is configured to update the first point cloud area according to the scan point cloud data.

8. The map scanning system of claim 7, wherein the plurality of point cloud areas and the plurality of image areas overlap each other.

9. The map scanning system of claim 7, wherein when the matching degree value is less than a matching threshold value, the processor is further configured to compare the location data with the basic map again, and the matching threshold value is different from the update threshold value.

10. The map scanning system of claim 7, wherein the processor is further configured to determine whether the basic map has been updated during an update period, and when the basic map has not been updated during the update period, the processor updates the first point cloud area according to the scan point cloud data.

11. The map scanning system of claim 7, wherein the processor is further configured to record the first point cloud area as an unupdated area, and when the vehicle is in an idle state, the processor updates the first point cloud area according to the scan point cloud data.

12. The map scanning system of claim 11, wherein when the vehicle is in the idle state, the processor is further configured to stop comparing the location data of the vehicle with the basic map.

13. A map scanning method, comprising:

scanning, by a lidar sensor of a scanning device, a location area of a vehicle to obtain a scan point cloud data;

scanning, by an image sensor of the scanning device, the location area of the vehicle to obtain a scan image data;

comparing, by a processor, the scan image data with a basic map to obtain a first image area in the basic map;

comparing, by the processor, the scan point cloud data with a part of the basic map corresponding to the first image area to obtain a first point cloud area in the basic map; and selectively updating the first point cloud area according to the scan point cloud data.

14. The map scanning method of claim 13, further comprising:

comparing the scan point cloud data with the first point cloud area to calculate a matching degree value; and when the matching degree value is less than an update threshold value, updating the first point cloud area according to the scan point cloud data.

15. The map scanning method of claim 14, wherein updating the first point cloud area according to the scan point cloud data comprises:

determining whether the basic map has been updated during an update period; and when the basic map has not been updated during the update period, updating the first point cloud area according to the scan point cloud data.

16. The map scanning method of claim 15, further comprising:

recording the first point cloud area as an unupdated area; and when the vehicle is in an idle state, updating the first point cloud area according to the scan point cloud data.

* * * * *